United States Patent [19]

Masters et al.

[11] Patent Number: 5,920,697

[45] Date of Patent: Jul. 6, 1999

[54] METHOD OF AUTOMATIC UPDATING AND USE OF ROUTING INFORMATION BY PROGRAMMABLE AND MANUAL ROUTING INFORMATION CONFIGURATION BASED ON LEAST LOST ROUTING

[75] Inventors: Steven Paul Masters, Kent; Eric Neil Lockard, Redmond, both of Wash.

[73] Assignee: Microsoft Corporation, Redmond, Wash.

[21] Appl. No.: 08/680,232

[22] Filed: Jul. 11, 1996

[51] Int. Cl.[6] ................................................ G06F 13/00
[52] U.S. Cl. ......................................................... 395/200.49
[58] Field of Search ........................ 395/200.71, 200.72, 395/200.31, 200.35, 200.33, 200.47, 200.49, 200.34, 200.39, 200.48, 200.59, 200.6, 680

[56] References Cited

U.S. PATENT DOCUMENTS

| | | | |
|---|---|---|---|
| 5,088,032 | 2/1992 | Bosack | 395/200 |
| 5,117,422 | 5/1992 | Hauptschein et al. | 370/95.1 |
| 5,218,699 | 6/1993 | Brandle et al. | 395/650 |
| 5,247,676 | 9/1993 | Ozur et al. | 395/650 |
| 5,283,856 | 2/1994 | Gross et al. | 395/51 |
| 5,426,674 | 6/1995 | Nemirovsky et al. | 395/200 |
| 5,517,620 | 5/1996 | Hashimoto et al. | 395/200.15 |
| 5,539,881 | 7/1996 | Hunt et al. | 395/200.02 |
| 5,615,254 | 3/1997 | Qiu et al. | 379/221 |

OTHER PUBLICATIONS

Shirley, John and Ward Rosenberry. "Microsoft RPC Programming Guide", O'Reilly & Associates, Inc., Sebastopol, CA, 1995.

Kramer, Matt, "Baranof's MailCheck 2.6 Delivers Improved Tools", PC Week, Sep. 11, 1995, Ziff–Davis Publishing Company 1995.

Frenkel, Gary, "cc:Mail View Keeps an Eye on Your Messaging System", Network Computing, Jun. 1, 1995, CMP Publications, Inc., 1995.

*Primary Examiner*—Moustafa M. Meky

[57] ABSTRACT

In an electronic messaging system which has multiple sites, and in which each site is defined by a unique address space and has connectivity to at least one other site, messages are sent by receiving at a first site message routing information from a second site. The message routing information defines routes from the second site to one or more of the plurality of sites. The received message routing information is assimilated into previously known routing information to generate an updated accumulation of routing information. The updated accumulation of routing information is used to route messages to one or more of the plurality of sites. The updated accumulation of routing information may be replicated to still other sites in the messaging system, which in turn assimilate the information into their respective collections of known routing information. This process of receiving, assimilating and replicating may be repeated until each of the sites has substantially the same updated accumulation of routing information.

45 Claims, 8 Drawing Sheets

Site B Message Routing Table

```
C = France                    Gateway = X.400GW1      Total Cost = 2
  A = Gold 400
    P = Data Connection C = US
  A = MCI
    P = IBM
      O = Boca Raton          Gateway = X.400GW1      Total Cost = 2
      O = San Jose            Gateway = X.400GW1      Total Cost = 2

P = M                     Connector = VA          Total Cost = 1
      O = A
```

FIG. 6A

Site A Message Routing Table

```
C = France
  A = Gold 400
    P = Data Connection       Gateway = VB            Total Cost = 4

C = US
  A = MCI
    P = IBM
      O = Boca Raton          Gateway = VB            Total Cost = 4
      O = San Jose            Gateway = VB            Total Cost = 4

P = M
      O = B                   Connector = VB          Total Cost = 2
```

Site C's Routing Table

| Destination | Route | Total Cost |
|---|---|---|
| D | Vcd | 1 |
| D | Vcf, Vfe, Ved | 21 |
| D | Vce, Ved | 108 |
| E | Vcd, Vde | 12 |
| E | Vcf, Vfe | 13 |
| E | Vcf, Vfg, Vge | 16 |
| F | Vcf | 9 |
| F | Vcd, Vde, Vef | 18 |
| F | Vce, Vef | 106 |
| G | Vcf, Vfg | 12 |
| G | Vcf, Vfe, Veg | 18 |
| G | Vcd, Vde, Vef, Vfg | 21 |
| G | Vce, Veg | 105 |
| Internet | Vcf, Vfg, Vgi | 14 |
| . | . | . |
| . | . | . |
| . | . | . |

FIG. 8

METHOD OF AUTOMATIC UPDATING AND USE OF ROUTING INFORMATION BY PROGRAMMABLE AND MANUAL ROUTING INFORMATION CONFIGURATION BASED ON LEAST LOST ROUTING

BACKGROUND OF THE INVENTION

The invention relates to the updating and use of routing information in an electronic mail ("e-mail") messaging environment.

Figure 1:
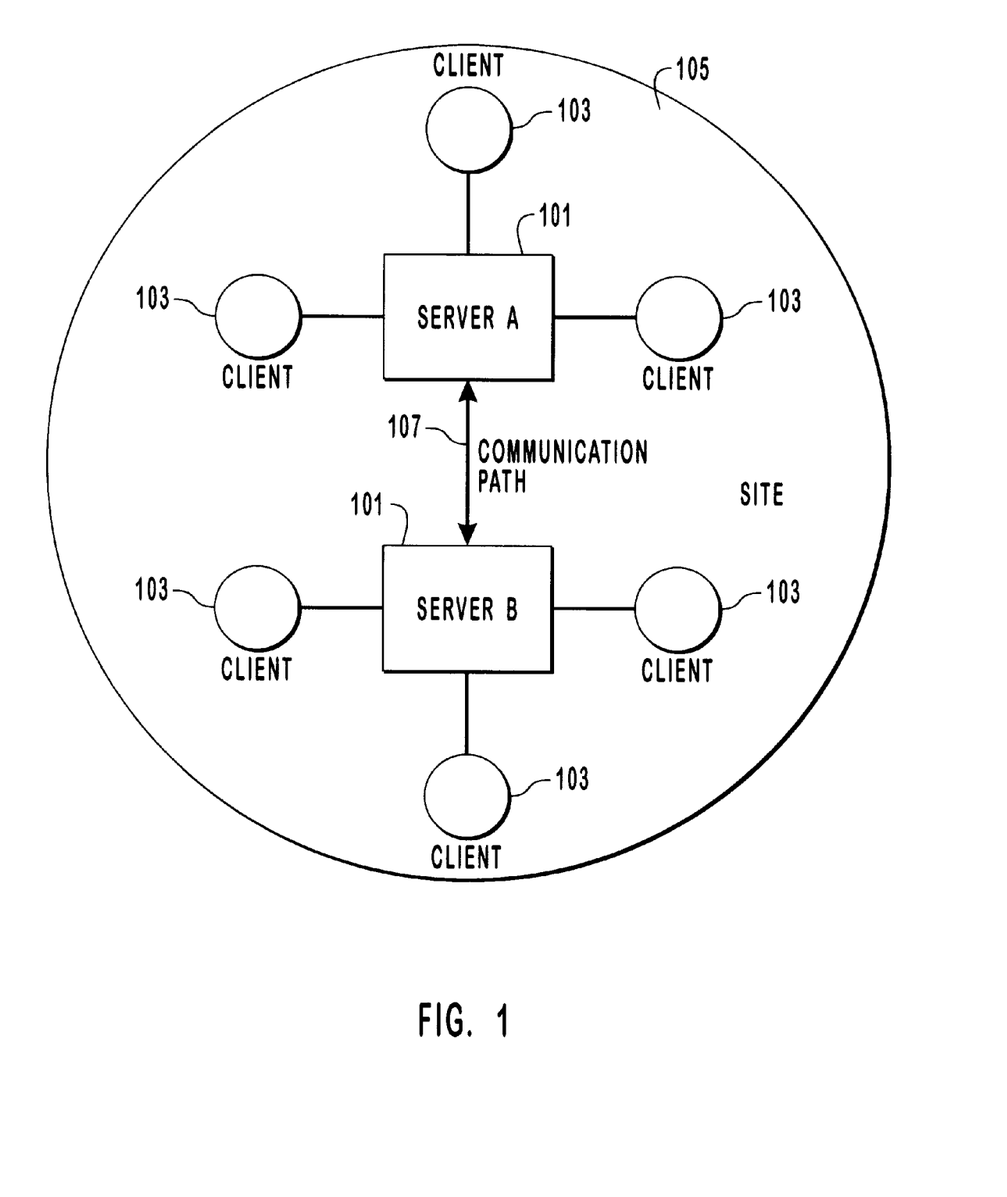
FIG. 1 is a logical block diagram showing an example of an e-mail system configuration.

A typical e-mail system as shown in FIG. 1 includes one or more interconnected servers 101 each serving one or more clients 103 (e.g., individual workstations). A client in turn may interact with an end-user—a human operator that seeks to use the e-mail system to communicate with other end-users, for example. The collection of interconnected servers 101 and their respective clients 103 constitute a single "site" 105 (or "address space") which may communicate with one or more other sites. A site is delimited by a unique e-mail address space—that is, each server 101 within a single site 105 shares the same e-mail address space. A collection of logically related sites is referred to as an "organization" which in turn collectively constitute an "enterprise." The various sites constituting an organization or an enterprise do not necessarily operate under the same vendor's messaging software or even use the same addressing scheme. Rather, any given site may represent a "foreign" messaging system—one that is provided by another vendor or that utilizes a different addressing scheme—from the perspective of any other site.

Each server within a site typically has a direct communication path 107 to every other server within the same site and may have a direct communication path to other servers in different sites within the same organization. A direct communication path allows a message to be delivered in a single "hop" between two servers. These communication paths represent logical, as opposed to physical, connections. Servers may be physically connected together by various connectivity components such as dedicated cable connections, modem-telephone line connections and/or wireless connections. A single physical connection is able to support multiple logical communications paths depending on factors such the bandwidth required for the various communication paths.

A mechanism that may be used to transport messages across a communication path from one server to another, either within a single site or across site boundaries, is the remote procedure call ("RPC"). An RPC passes the thread of execution from one memory address space to another memory address space while maintaining program context. Two servers that may communicate directly with each other using an RPC are said to have direct RPC connectivity. The RPC protocol is discussed in detail in "Microsoft RPC Programming Guide," John Shirley and Ward Rosenberry, O'Reilly & Associates, Inc., Sebastopol, Calif., 1995, which is incorporated herein by reference.

In a typical application of an e-mail system, an end-user uses an associated client 103 connected to a particular server 101 within site 105 to send an e-mail message, or some other type of information packet, to another end-user who may be connected to a client in the same or a different site. The site in which the message originates is the "originating" or "local" site and the server that receives the message is the "destination" or "remote" site. The destination site may be within the same organization as the originating site or within a different organization.

In sending a message from one site to another, messaging systems typically rely on "routing tables," which are static repositories of information that contain the routing information necessary for a site to know with which remote sites it may communicate and how to communicate with those sites. A routing table is manually generated and maintained by the system administrator based on his or her knowledge of other sites to which connectivity is available.

When a site is newly created, the administrator for the new site typically enters a large volume of routing information into the routing table so that the newly created site may communicate with other sites. The administrators of other existing sites manually update the routing tables for their respective sites to reflect the presence and availability of the newly created site. Similarly, when a site is taken down, the administrators of other remaining sites manually update their respective routing tables to reflect the fact that the removed site is no longer available. This generation, updating and maintenance of routing tables often is a time consuming and burdensome process for the system administrator. Moreover, if a particular system administrator has not been informed of the changes, or neglects to update the routing table, a user may not be able to send a message to a remote site.

The particular routing that a message will take depends in part on the relationship between the originating site and the destination site. In a simple case of transmitting a message from a local site that has direct RPC connectivity to the destination site, the corresponding routing is relatively simple because only a single hop will be required to deliver the message. The routing process becomes more complex when the local site does not have a direct communication path to the destination site, but rather one or more intervening sites lies between the local site and the destination site. Any message traffic between those two sites will have to make a series of hops, from one site to another, until the destination site is reached.

In the multiple hop case, the routing table in the local site contains information sufficient to determine the next site to which the message should travel en route to its final destination—that is, the "next hop" that the message should take. The routing table in the local site does not know, and cannot control, the actual path that the message will travel to reach the destination site. Rather, the local site must rely on each successive site in the path to make its own next hop decision to facilitate delivery of the message. As a result, a message may be routed to its destination in an inefficient manner.

SUMMARY OF THE INVENTION

The present invention involves a technology for the automatic discovery and use of routing information in a messaging environment and the calculation of all possible message routes within that environment based on the discovered knowledge. The e-mail system may exist in a replicated environment in which any changes in routing data that occur at a particular site are made available to each of the other sites. In an environment where multiple messaging systems are tightly coupled through the use of shared, replicated knowledge, the routing discovery and calculation processes will encompass all of the systems rather than just a single, local system.

According to one aspect of the invention, an electronic messaging system includes multiple sites in which each site is defined by a unique address space and has connectivity to at least one other site. Messages are sent by receiving at a first site message routing information from a second site. The message routing information defines routes from the second site to one or more of the plurality of sites. The received message routing information is assimilated into previously known routing information to generate an updated accumulation of routing information. The updated accumulation of routing information is used to route messages to one or more of the plurality of sites. The updated accumulation of routing information may be replicated to still other sites in the messaging system, which in turn assimilate the information into their respective collections of known routing information. This process of receiving, assimilating and replicating may be repeated until each of the sites has substantially the same updated accumulation of routing information.

In the process of assimilating newly received routing information into existing routing information, a subset of the received message routing information (for example, routing information relating to previously known or unchanged routes or message routing information that would cause a message to loop back to its origin) may be ignored in generating the updated accumulation of routing information.

The updated accumulation of routing information may be implemented as a routing table which includes at least one destination site, one or more routes to reach the at least one destination site, and a total cost for using each of the one or more routes.

According to another aspect of the invention, messages may be routed in the electronic messaging system by maintaining and using a repository of message routing information which forms the basis for message routing decisions. The repository includes an identity of at least one destination site, a plurality of routes for reaching the destination site, and a total cost associated with each of the respective plurality of routes. One of the plurality of routes is chosen based on its associated total cost, for example, the lowest cost route, and the message is sent from the originating site to the destination site using the chosen route. This route may traverse one or more intermediate sites before it reaches the destination site.

Each potential route is composed of one or more connectors specified in a sequential order. The message is passed sequentially from one connector to the next connector in the route until the message reaches its destination site. Each connector provides direct connectivity between two sites and has an associated individual cost. The total cost is of a route is equal to the individual costs of its constituent connectors, plus an optional increment amount for each intermediate site encountered along the route. The cost associated with a particular connector and/or route represents a predetermined measure of resources (e.g., monetary expense, bandwidth usage, processing time) for using that connector.

An intermediate site, upon receiving a message bound for a destination site, may dynamically re-route the message to account for changes in network topology not yet known to the originating site. For example, an intermediate site may route a message through a different connector (either more or less expensive) if the originally designated connector has become unavailable. An intermediate site also will reroute a message if another route is available that is less expensive (lower total cost) than the originally designated route. This ensures that the least expensive route will always be taken by a message when traveling from an originating site to a destination site.

The techniques described here are not limited to email systems but rather find applicability in any network that transmits information between different nodes, or locations.

Moreover, this technology may be implemented in hardware or software, or a combination of the two. Preferably, the techniques are implemented in computer programs executing on programmable computers that each include a processor, a storage medium readable by the processor (including volatile and non-volatile memory and/or storage elements), at least one input device, and at least one output device. Program code is applied to data entered using the input device to perform the functions described above and to generate output information. The output information is applied to one or more output devices.

Each program is preferably implemented in a high level procedural or object oriented programming language to communicate with a computer system. However, the programs can be implemented in assembly or machine language, if desired. In any case, the language may be a compiled or interpreted language.

Each such computer program is preferably stored on a storage medium or device (e.g., ROM, hard disk or magnetic diskette) that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner.

Other advantages and features will become apparent from the following description, including the drawings and claims.

BRIEF DESCRIPTION OF THE DRAWINGS

FIG. 5b illustrates the connection between the sites of FIG. 5a.

DESCRIPTION OF THE PREFERRED EMBODIMENTS

In one embodiment of the messaging system architecture, the ability to communicate with an arbitrarily large number of messaging sites in an integrated and cohesive manner may be achieved through the use of a "directory service"—a repository of information that is distributed across the sites in an organization and which defines the set of remote sites that are reachable from any particular site and how those remote sites may be reached. The directory service includes a routing table which lists potential routes for reaching remote sites, software components that facilitate connections between sites, and a database that stores information concerning the attributes of the individual servers and end-users of the e-mail system, including permissions and the like.

In one embodiment, each server maintains its own copy of the directory service database so that all servers within a single site will have access to the same information concerning remote sites. Each server also has its own directory service process by which other applications may make requests to read and write information. Other embodiments are possible in which fewer instances of the directory service exist than the number of servers in the site. The only requirement is that each server has connectivity to an instance of the directory service in order that information can be read or written as appropriate. In addition, the use of a directory service is not necessary, but rather any other mechanism for storing and retrieving routing information may be used in its place.

One component of the directory service is the site connector—a software object (defined as a discrete entity, comprising data and processes that act on that data, for performing a specific task) that facilitates intersite communications by configuring and managing RPC connections across different sites within a local area network ("LAN"). Each instance of the site connector object identifies one and only one remote site, and describes the connectivity between the local site and the designated remote site. In other words, a separate site connector object is provided for each remote site to which a potential connection exists. Generally speaking, a site connector is used to connect together sites of the same type, for example, those operating under the same vendor's messaging software and/or using the same addressing scheme.

Another class of object potentially present in the directory service is a gateway connector object, which is similar to a site connector object except that a site connector describes and manages connections to other sites of the same type within the same LAN, whereas a gateway connector object is typically used to reach a remote foreign messaging system—i.e., one that is provided by another vendor or that utilizes a different addressing scheme. In addition, whereas a site connector ordinarily facilitates only RPC connectivity between sites, a gateway connector may provide a broader assortment of connectivity mechanisms such as telephone lines, networks and the like.

Each instance of the gateway connector object ordinarily identifies only one foreign system, and thus describes the connectivity between the local site and that foreign system, but a single gateway connector may be used to reach more than one remote system, if desired. In addition, a gateway connector may be used to interconnect messaging sites of the same type, in a manner similar to a site connector object.

Figure 2:
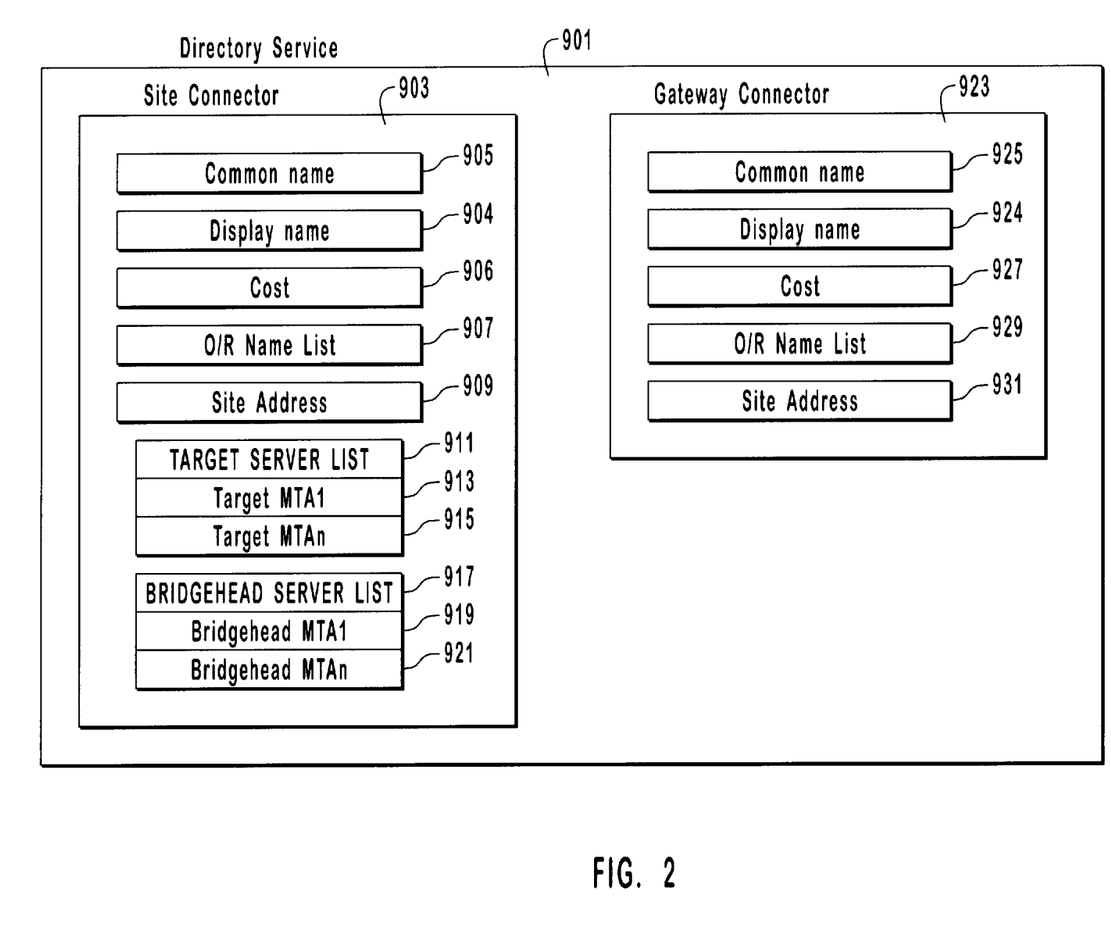
FIG. 2 is a partial data diagram for a directory service containing a site connector object and a gateway connector object.

FIG. 2 is a simplified representation of the directory service showing two different classes of connector objects— the site connector object 903 and the gateway connector object 923. The site connector object 903 includes its common name 905 within the directory service so that the site connector object may be located by other objects and a display name 904, e.g., ASCII encoded text which is readable by a human. An optional cost parameter 906 may be included which specifies a predetermined measure of resources that will be expended in using the site connector. The value assigned to the cost parameter 906 may correspond to the monetary expense of using this connector (for example, the charge that would be imposed by the communications service provider) or it may correspond to any other measure of resources—for example, the amount of processing time or bandwidth that will be expended if the site connector is used.

Assigning a cost value to a connector is typically performed off-line by the system administrator—i.e., before the e-mail application has been launched, but it could also be performed in a dynamic manner—i.e., while the e-mail application was running. The cost values conceivably could be automatically altered by a software process to adapt to changing network topologies or conditions.

The site connector 903 also includes the site address 909 of the site on which this connector is running, and an O/R (originator/recipient) Name List 907—a list of all remote address spaces that are reachable from the source site. The first remote address space appearing in the O/R Name List 907 is the remote site for which the connector was created and to which the connector provides a direct (single hop) communication path. Any subsequent entries in the O/R Name List represent address spaces that are indirectly reachable (more than one hop) through this connector.

Other components of the site connector object 903 include the target server list 911, which is a table of the message transfer agents ("MTAs") (913, 915) in the destination site that are potentially available to establish a communication path with an MTA in the source site. An MTA is a program that executes on a server (each server has its own dedicated MTA) and which, when invoked, performs the handshaking functions with an MTA on another server, either within the same site or in a remote site, to establish a connection and exchange data with the other server. MTAs and their use are known in the art. The target server list potentially may identify any number of target MTAs in the destination site, but only those target MTAs listed are available to form a communication path between two servers. In FIG. 2, the remote MTAs are identified as MTA1, . . . MTAn, where n is a positive integer.

The site connector object 903 also may contain a bridgehead server list 917 which defines the set of "bridgehead" MTAs in the source site—i.e., those MTAs that are allowed to form connections with target MTAs at remote sites. The transmission of messages between two servers in a messaging system is discussed in more detail in commonly-assigned U.S. Ser. No. 08/680,233, filed Jul. 11, 1996, now U.S. Pat. No. 5,872,930, entitled "LOAD BALANCING BETWEEN E-MAIL SERVERS WITHIN A LOCAL AREA NETWORK," which is incorporated herein by reference.

The gateway connector 923 is similar to the site connector except that it does not include a target server list or a bridgehead server list. A gateway connector typically is implemented as a separate computer process that is connected to an MTA. The MTA routes messages to the gateway based on the address space(s) covered by the gateway. One or more gateways may be connected to a single MTA. An association between a gateway and an MTA is made by an entry in the routing table. The routing table lists the directory name of the gateway connector that covers the address space that is being reached. The gateway connector is then looked up in the directory and the information about the actual gateway connector is obtained. This way the MTA does not need to have knowledge about connected gateways at all times, just when gateway connectors are available.

The gateway connector object includes its common name 925 and display name 924; an optional associated cost parameter 927; an O/R Name List 929 of all address spaces reachable through this connector, the first of which is the address space that is one hop away. The site address 931 is the address of the site on which this gateway connector is running.

Figure 3:
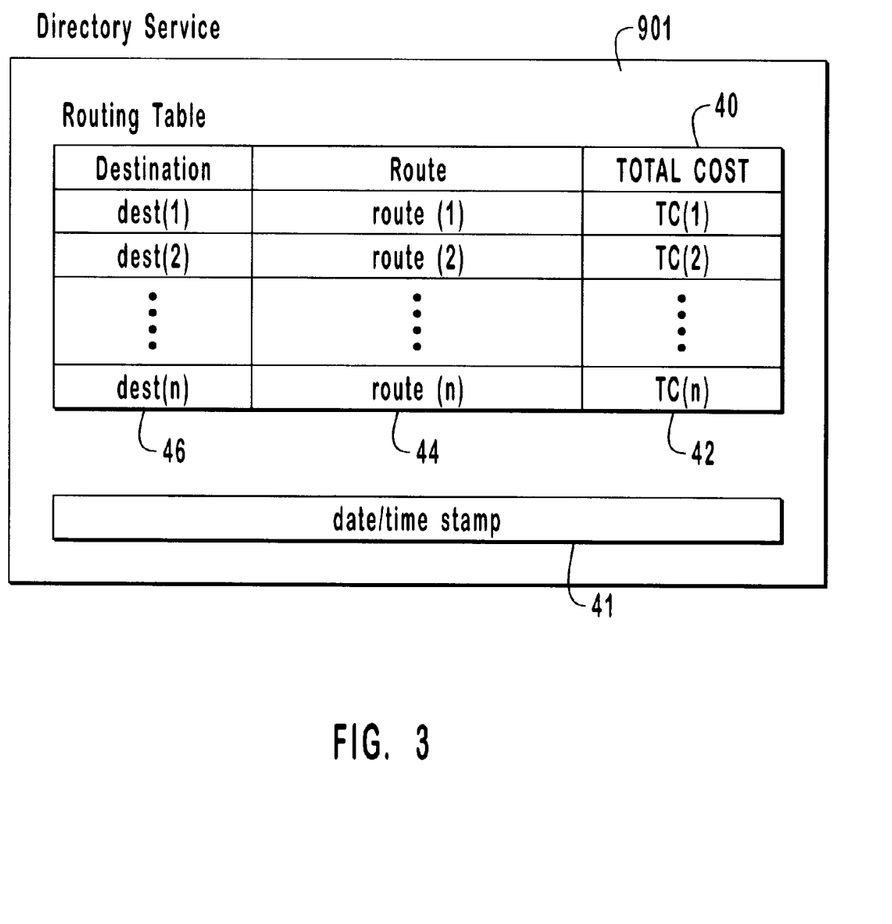
FIG. 3 is a partial data diagram showing another portion of the directory service, a routing table and a date/time stamp.

Another primary component of the directory service is the routing table, a simplified data diagram for which is shown in FIG. 3. The routing table 40 contains the routing information for reaching remote sites from the perspective of the local site. It represents a distillation of the information contained in the site connector and gateway connector objects present in the directory service, as well as information about routing that has been learned from other sites.

Each entry in the routing table 40 has three fields: a final destination 46 which represents the address space for which the message is bound, a route 44 by which the message may travel to reach that destination, and an associated total cost ("TC") 42 for using that route. A route is a series of one or more consecutive communication paths which traverse different address spaces and over which a message will travel to reach its destination. The route field 44 in a routing table will list, in proper routing path order, the name of connector leading out of the local site followed by the names of subsequent connectors in remote sites along which the message will travel en route to its final destination.

A single destination may have multiple entries in the routing table, thereby signalling that more than one route to that destination is potentially available. Ordinarily, an MTA seeking to send a message to a destination for which multiple routes are available will pick the route with the lowest associated cost. The other more costly routes will be used only if the lower cost routes have been attempted and "failed," which typically is some sort of permanent or semi-permanent problem that prevents the communication path from functioning properly.

The information contained in the routing table may come from either or both of two different sources: (1) from site connector and gateway connector objects that have been manually generated and installed in the site by the system administrator; or (2) from routing table information known by a remote site which is made available to the site in question through a process of replication and distribution.

In the first case, the system administrator generates a new site connector or gateway connector object by specifying the items of information shown in FIG. 2 as desired, and installing the connector in the site. In creating a connector object, the administrator must necessarily specify, as the first entry in the O/R Name List, the address of the address space for which the connector is being created and to which the connector provides a single hop communication path, or in other words the "primary" address space. In addition, the administrator optionally may specify, as subsequent entries in the O/R Name List, one or more addresses of secondary address spaces that the connector may reach in an indirect manner (that is, by making one or more hops past the primary address space. The process of creating a new connector to a remote site may be repeated as many times and as frequently as the system administrator desires.

In the second case, new routing information is made available to a site when one or more remote sites replicates, or clones, its own routing table information and broadcasts that information to the site. When a remote site replicates its routing table information it will broadcast that information to each site to which it has a direct communication path (that is, a path requiring only a single hop). The receiving sites will assimilate the replicating site's routing table information into their own respective routing tables which in turn will be replicated subsequently and broadcast to those sites to which the receiving sites have a direct communication path. This process is repeated continuously on a periodic basis thus ensuring that all new or modified routing information eventually will propagate across all of the sites in a cascading fashion.

The frequency with which routing information is replicated depends on the logical relationship between the source of the routing information and its destination. If the source of the new routing information is within the same site as its destination (e.g., through the addition or modification of a connector on a server within the site), intrasite replication to other servers should occur as soon as possible (on the order of minutes) after the connector has been installed to insure that each server in the site has a consistent view of the available connectors.

On the other hand, if the source of the new routing information is from another site, replication of the routing information is less urgent and thus need not be performed as often. The intersite replication latency (delay) is determined by the system administrator and may be on the order of minutes, or as long as 24 hours.

A replication sequence, either intersite or intrasite, also may be triggered manually by a system administrator to cause replicated routing information to be broadcast to all of the directly connected sites (or to all of the other servers in the same address space in the case of intrasite replication), or to any subset thereof.

When new routing information becomes available in a site either through replication of routing table data or through the manual generation of connectors, a software process, for example, a routing information daemon ("RID") process, automatically regenerates the routing table to include the newly received routing information. When regenerating its routing table based on newly received replicated information, a site is interested only in previously unknown routes to remote address spaces, and in known routes whose total cost may have changed due to a change in cost for one or more hops along the route. All redundant or known routes that have not changed and which are included in the replicated information consequently are ignored by the RID process. In addition, a RID process regenerating the routing table for a particular site will disregard routes included in replicated information where that site is listed as the destination site, because it would be non-sensical for a site to have a route to itself included in its routing table.

Figure 4:
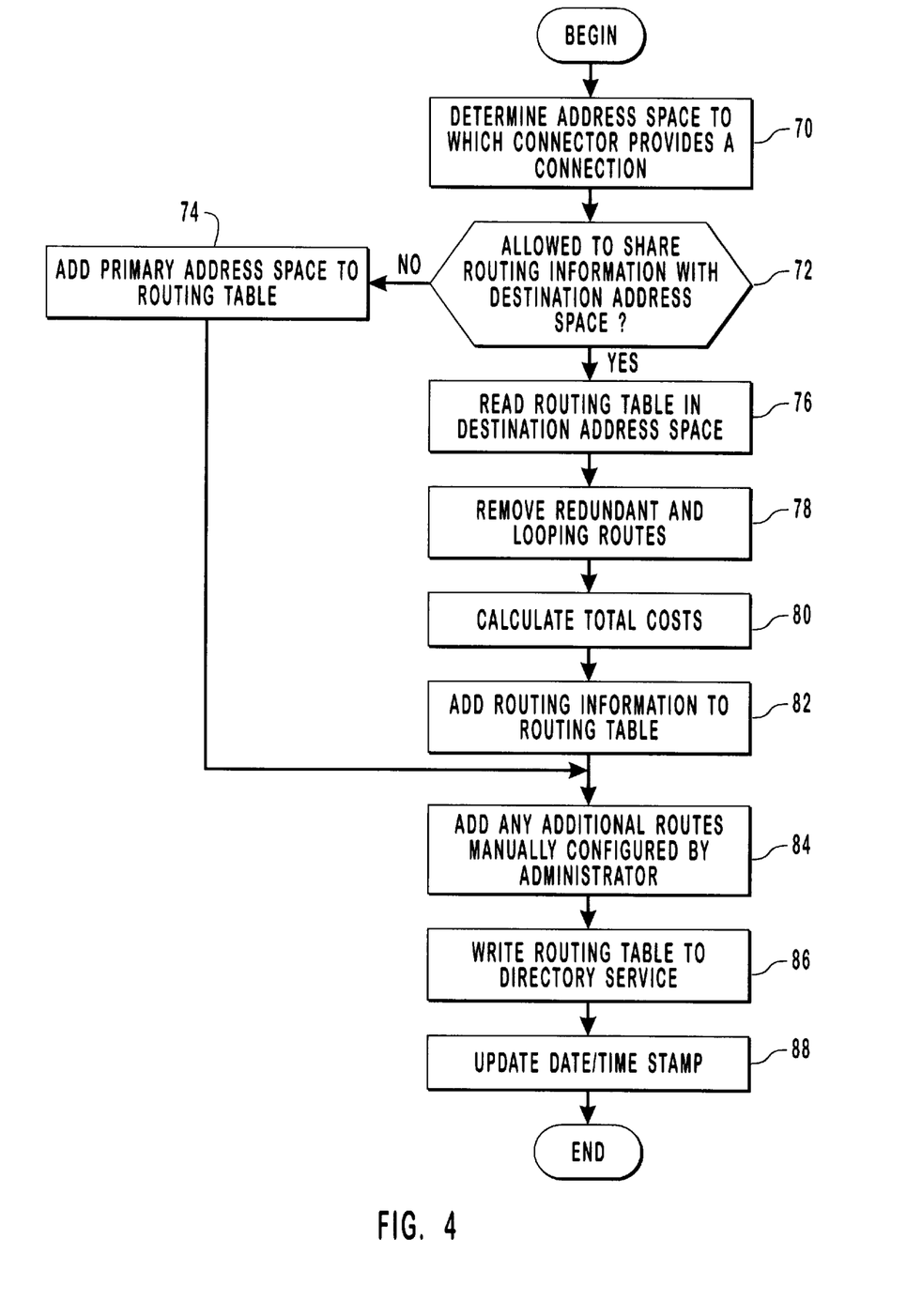
FIG. 4 is a flowchart for regenerating the routing table of FIG. 3.

FIG. 4 is a flowchart of the logical steps that are performed in regenerating a routing table when new routing information appears in a site. At step 70, the RID process inspects the new routing information (either the information contained in a new connector object which was manually configured by the administrator and installed in the site or information contained in a replicated routing table from a remote site) one entry at a time and determines the primary address space for that entry.

At step 72, the RID process determines if the primary address space under consideration is one with which the local site is not allowed to share information—for example, a foreign address space. If sharing is not permitted, the RID process adds the previously determined primary address space to the routing table in step 74 provided that it was not already present in the routing table. At step 84, the RID process also will add any secondary address spaces associated with the primary address space that were manually specified by the administrator as part of the O/R Name List.

In step 86, the newly generated routing table is written back into the directory service (or any other information repository that may be in use), and at step 88 the date/time stamp is updated to reflect the time of the regeneration. The MTAs in a site will periodically check the date/time stamp for the routing table in that site and will update their own respective local copies of the routing table if the date/time stamp has changed since the last check. This helps to ensure that the MTAs for a site will use the most recent version routing table in making routing decisions.

Alternatively, a notification mechanism may be used to inform the MTAs that new routing information is available. In that case, whenever new routing information is written into the directory service, the directory service notifies the particular MTAs affected by the information, which in turn will read this new information and use it to process messages. This way the delay between the time a change is made and the time the information becomes utilized by the system is minimized.

If at step 72 it is determined that the primary address space is one with which the local address space may share information, at step 76 the RID process then reads the routing table in the primary address space to gather its routing information. At step 78, the RID process removes (i) any redundant routes that have not changed (those routes already present in the local site's routing table for which neither the identity nor the cost of the individual connectors has changed) and (ii) any "looping" routes (those routes that will take the message back through the local site, either as an intermediate or final destination).

At step 80, the total costs for the remaining routes are calculated by summing the cost of each connector that will be used en route to the final destination and then adding an extra cost unit for each intermediate site that is traversed on the way to the final destination. Adding an extra unit to compensate for intermediate hops reflects the fact that each additional hop in the route will increase the cost of the message transfer because it will necessarily entail the use of additional processing power, bandwidth and the like. This way a route through a single connector having a cost of 3 units will be cheaper than a route that uses three connectors, each having a cost of 1 unit, due to the added overhead of each hop. Any cost value other than 1 unit for intermediate hops alternatively may be used as desired by the system administrator.

After the redundant and looping routes have been weeded out, and the respective total costs for the remaining routes have been calculated, the new routing information is added to the routing table for the local site at step 82.

At step 84, the RID process also will add any secondary address spaces associated with the primary address space that were manually specified by the administrator. At step 86, the newly generated routing table is written back into the directory service, and the date/time stamp is updated at step 88.

Because replicated routing information represents new potential routes for sending messages, the regeneration of the routing table to include the newly received routing information is very important and should occur whenever new data is available. This is true for both intrasite replication data and intersite replication data. This way the routing tables are as up to date as possible at all times.

This is not to say, however, that routing table regeneration occurs immediately after replicated data is received. Rather, regeneration will occur periodically, in one embodiment, every 2–3 minutes. As a result, newly received replicated information will sit unprocessed for no longer than a few minutes after its receipt. Limiting the frequency of regeneration in this manner is useful because changes may occur fairly rapidly, especially in the early stages of setting up a mail system. Rather than make the changes in rapid succession at each site, a pause of a few minutes permits most or all of these changes to be made at one time, and thus prevents the system from becoming bogged down. Regeneration also may be triggered by the system administrator manually.

An example of how routing table information is initially developed and built up over time in an e-mail system is provided below. Although the technology and concepts described herein may be implemented through any suitable addressing scheme (e.g., Simple Mail Transfer Protocol ("SMTP") among others), the below example is explained in terms of the X.400 protocol, which is described in the CCITT Blue Book, Volume VIII—Fascicle VIII.7, "Data Communications Networks Message Handling Systems, Recommendations X.400–X.420," ISBN 92-61-03721-6 (see in particular Recommendation X.411, "Message Handling Systems: Message Transfer System: Abstract Service Definition and Procedures""); and in ISO 10021-4, "Information Processing Systems—Text Communication," which are incorporated herein by reference.

Every messaging system starts with a single site containing one or more servers. The administrator sets up the site by assigning a site name and specifying connector is and address space data. When a new site is to be initialized, the administrator will specify an address space based on a universal addressing scheme, in the present example, the X.400 protocol.

The X.400 addressing protocol provides for an originator/recipient (O/R) address format that specifies a tree-structured hierarchy. An O/R address may be represented by the following hierarchically ordered attributes:

Country
    Public Administration Domain (ADMD)
        Private Administration Domain (PRMD)
            Organization
            Organizational Units (OU)
                Common Name
                Personal Name
                    Surname
                    Given Name
                    Initials
                    Generation Qualifier
                Domain Defined Attributes (DDA)

When setting up a new site, the administrator defines the address space by specifying a Country attribute corresponding to the country in which the site is physically resident (for example, "US"); an ADMD attribute (optional), which is a public provider of communications services such as MCI™; a PRMD attribute which for example is the name of the company in which the site resides (e.g., "Microsoft"), and an Organization attribute which is an arbitrary name used to identify the site.

In addition to the Organization attribute, up to four OU attributes may be used to denote specific sub-organizations, divisions, sections, groups and the like, within a PRMD. The Common Name, Personal Name and DDA attributes uniquely identify message recipients within an organization, and have no implied hierarchy relative to each other. However, the entire set of attributes form a hierarchical address space tree, wherein, for example, an ADMD is unique within the particular country that it resides, a PRMD is unique within a particular ADMD, and so forth. Thus, if a given O/R address does not specify a value for all of the attributes within the hierarchial address space tree, it must specify values for enough of the attributes to uniquely identify a message recipient.

Figure 5A:
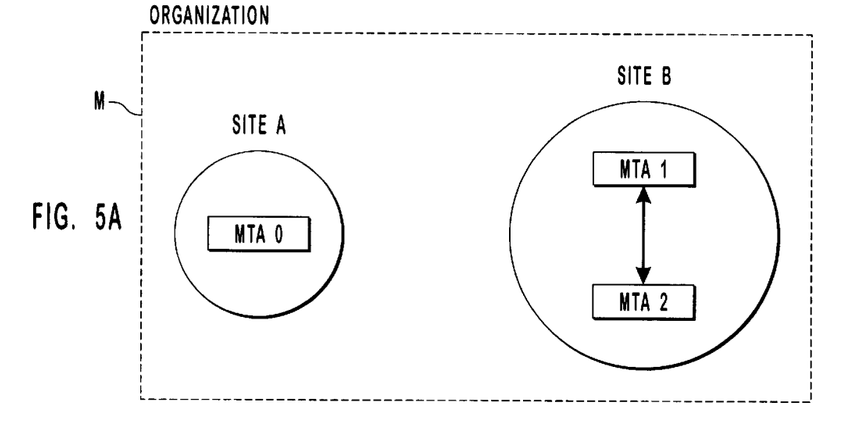
FIG. 5a illustrates two sites in an organization.
Figure 5B:
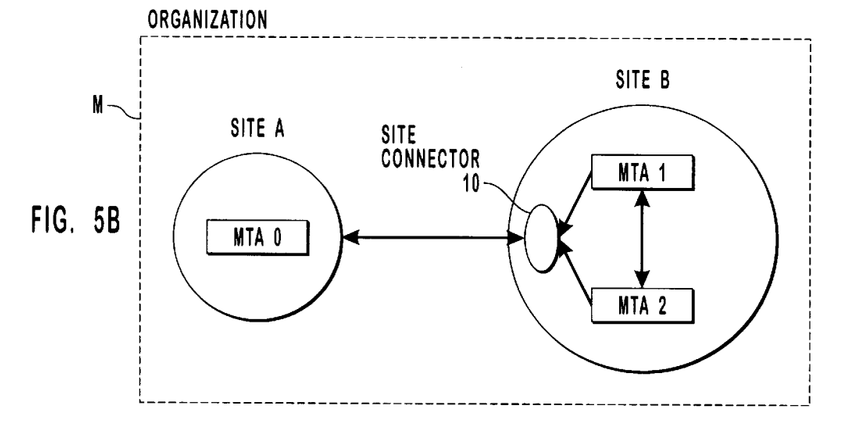
Figure 5C:
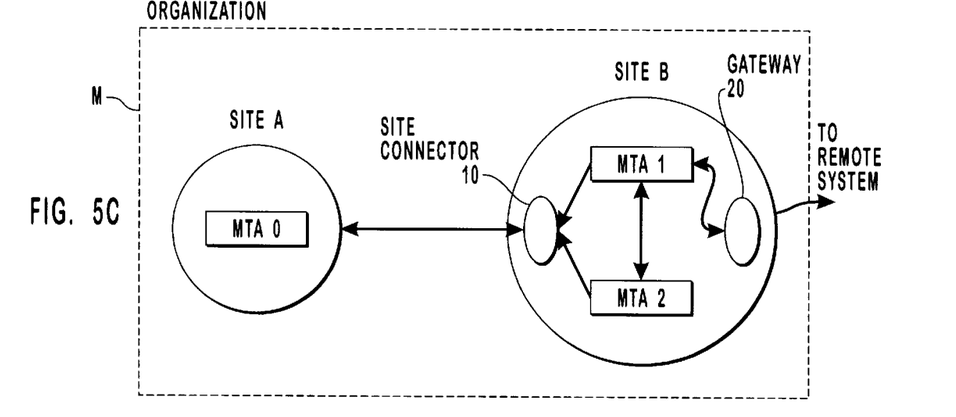
FIG. 5c illustrates the addition of a gateway to one of the sites of FIG. 5b.

FIGS. 5a–5c are simplified block diagrams depicting an organization "M" having two sites, "A" and "B," to illustrate how a messaging system may be initialized. Referring to FIG. 5a, a system administrator creates a first site in the "M" company, names it "A" and installs a message transfer agent, MTA0. Using the X.400 address protocol, the administrator assigns an address to site A by specifying a country attribute for the country in which the site is located ("US"), an ADMD attribute ("MCI"), a PRMD attribute (the company's name, "M"), and an arbitrary site name ("A") which serves as the Organization attribute. The resulting in the partial O/R address of the site would be as follows: "X.400: C=US/A=MCI/P=M/O=A". The O/R address is "partial" in the sense that it only specifies the upper part of the hierarchial address space tree and does not provide sufficient information to send a message to a particular end-user of the e-mail system.

At this point in the creation of the site, no site or gateway connector objects are present in the directory service because no connectors and/or gateways out of the site have been installed or defined either through replication/routing table regeneration or manually by the administrator. Consequently, the message routing table for site A is null, and messages cannot be transferred out of is site A.

Next, the administrator creates site B having a partial O/R address of "X.400: C=US/A=MCI/P=M/O=B" and installs two message transfer agents, MTA1 and MTA2, one in each of two servers residing in site B. Since MTA1 and MTA2 reside in the same site, they exist in the same directory service and thus by definition have knowledge of each other so that end-users of the servers within site B may transfer data to each other without further configuration.

Referring to FIG. 5b, the administrator creates a site connector 10 in site B by specifying the items of information shown in FIG. 2 and installing the connector in the site. In this case, assume that the administrator has specified that connector 10 will have a cost of 1 unit. The RID process then generates a routing table for site B in the manner illustrated in FIG. 4 based on the routing information specified in site connector 10. As a result of table generation, the routing table for site B will contain a single route (via connector 10) to a single destination (site A). Site B's routing table at this point will appear as follows:

X.400: C=US/A=MCI/P=M/O=A>connector=VA, cost=1
where "VA" is the display name of the site connector and "1" is the cost preassigned by the administrator for using connector VA.

As soon as the routing table for site B is written back into the directory service it becomes available for MTA1 and MTA2 to establish connections to site A. At this point accordingly, an end-user in site B is able to send a message to reach the address space of a recipient at site A.

Next, assume that site A has replicated its (still null) routing table and broadcast that information to site B, the only site of which it is aware. Subsequently, the RID process at site B attempts to regenerate the site B's message routing table based on the replicated information received from site A. However, because the message routing table for site A is still null, it contains no new routing information from site B's perspective. Consequently, even after this regeneration, site B's routing table still has only a single entry—the route from site B to site A.

Assume next that site B replicates its routing table and broadcasts that information to site A, which in turn regenerates its routing table to appear as follows:

X.400: C=US/A=MCI/P=M/O=B>connector=VB, cost=1
where "VB" is the display name of the site connector and "1" is the cost for using connector VB. This single entry in site A's routing table specifies that messages with the initial address "X.400: C=US/A=MCI/P=M/O=B" will be routed out of site A using the site connector object for site B. After all of the foregoing has occurred the known messaging topology is as shown in FIG. 5b.

In FIG. 5C, the administrator installs an X.400 wide area network (WAN) gateway 20 at site B, which may be utilized to reach a remote foreign mail system. The administrator names the gateway "X.400GW1" and associates it with MTA1. During the installation process, a gateway connector object is created in the directory service to represent X.400GW1 and the bridgehead server list in the gateway connector object identifies MTA1 as the bridgehead server. The administrator uses utility programs associated with the gateway to configure X.400GW1 to cover the following partial O/R addresses, each of which is assigned a cost value of 2 units by the administrator:

X.400: C=US/A=MCI/P=IBM/O=Boca Raton
X.400: C=US/A=MCI/P=IBM/O=San Jose
X.400: C=France/A=Gold 400/P=Data Connection.

These O/R addresses define three different destinations that may be reached through this gateway: an IBM office in Boca Raton, an IBM office in San Jose, and a Data Connection office in France. This information is stored as values of the O/R Name List in the X.400GW1 gateway connector object.

After installation of the gateway is completed, the site B message routing table is out of date because it does not reflect the availability of the gateway for routing messages. Consequently, when the RID process next queries the directory service for all site and gateway connector objects in site B, the X.400GW1 and site A connectors objects will be returned. The RID process then accesses the address space attributes of the X.400GW1 object and regenerates the site B message routing table as shown in FIG. 6a.

Figure 6A:
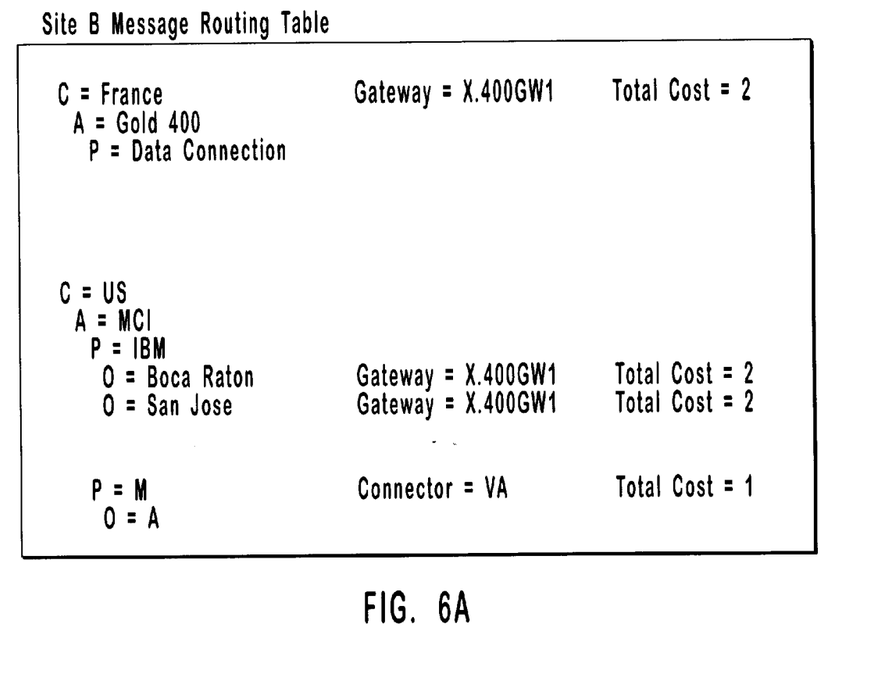
FIG. 6a illustrates a message routing table for site B in FIG. 5c.

Referring to FIG. 6a, the gateway address spaces for France and the USA for the above example are shown along with total cost and address space information. According to the routing tree, messages sent from site B to Data Connection in France, or to the IBM Corporation at Boca Raton or San Jose incur a total cost 2 units, while messages to a user in site A cost 1 unit.

After the new routing table has been created for site B, it is subsequently replicated and distributed to site A, at which point the RID process for site A executes and finds that new connector and address data are available from the distributed directory service. Alternatively, the distributed directory service may issue a notification signal to alert the RID process that address and connector data has changed. The RID process for site A then regenerates the site A message routing table to include the changes, so that it appears as shown in FIG. 6b.

Figure 6B:
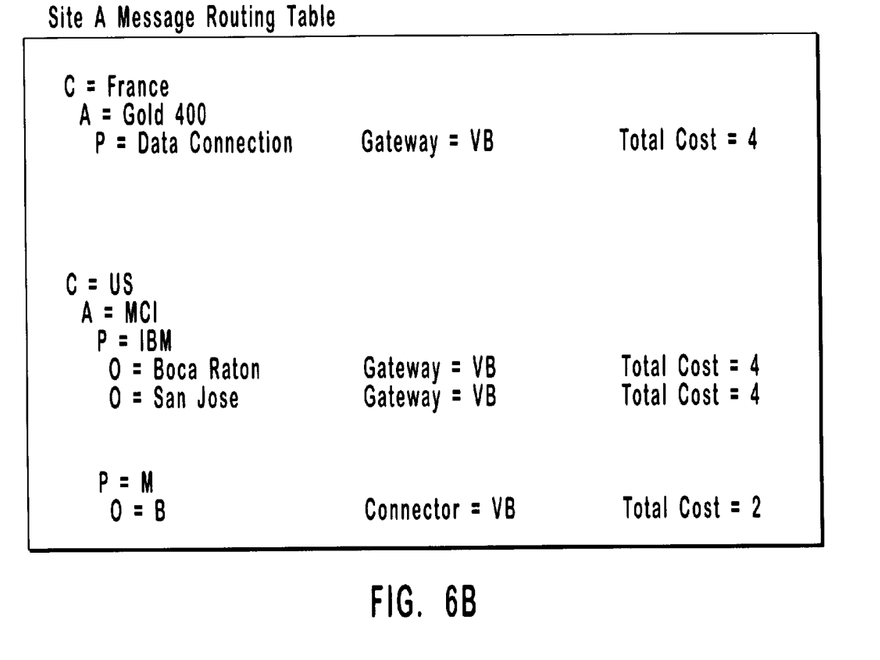
FIG. 6b illustrates a message routing table for site A in FIG. 5c.

Referring to FIG. 6b, note that the routing table data specified for the address space information imported from site B specifies VB as the connector to which messages bound for X.400GW1 should be routed. Message transfer agent MTA0 in site A need not know that an X.400 gateway exists in the site B, only that a message transfer agent in site B will know what to do with a message addressed to recipients residing in the address space covered by X.400GW1.

In the particular example described above, although the total cost for sending a message from site B to a recipient in site A is 1 unit, the total cost for sending a message in the reverse direction (i.e., from site A to a recipient in site B) is 2 units. This is true because the total cost value is particular to each local site, and thus may be differ with the direction of message flow depending on the cost parameters preset by the administrator.

In the manner described above, a RID process executes in each site and utilizes replicated address and connector information to gain knowledge of all remote connectors and gateways. Thus, as new sites and connectors are added to the messaging system, their address and connection information is added to each site's message routing table along with calculated total cost values. Similarly, as connectors are replaced or deleted from a site, the changes are made available to all other sites which will correct their message routing tables accordingly to avoid an incorrect routing of a message. The resulting site message routing table identifies destinations and the cost to get there from the viewpoint of that local site. Thus, knowledge is gained of the universe of address spaces that can be reached throughout the messaging system.

As a messaging system grows larger and larger through the addition of sites with new connectors and gateways, the techniques described above simplify the task of keeping track of the voluminous message routing information for complex topologies. When change in topology occurs, the corresponding routing data propagates from one site to another via the distributed directory service so that updating of local site message routing tables with first hop and intermediate hop data can automatically occur.

Thus, the present method permits each local site of an e-mail organization to have knowledge of the connectors and associated costs from the local site to each destination. This is possible because the replicated environment permits a local site to acquire knowledge of the complex topology of the messaging system, and to build a routing table as viewed from that local site.

Figure 7:
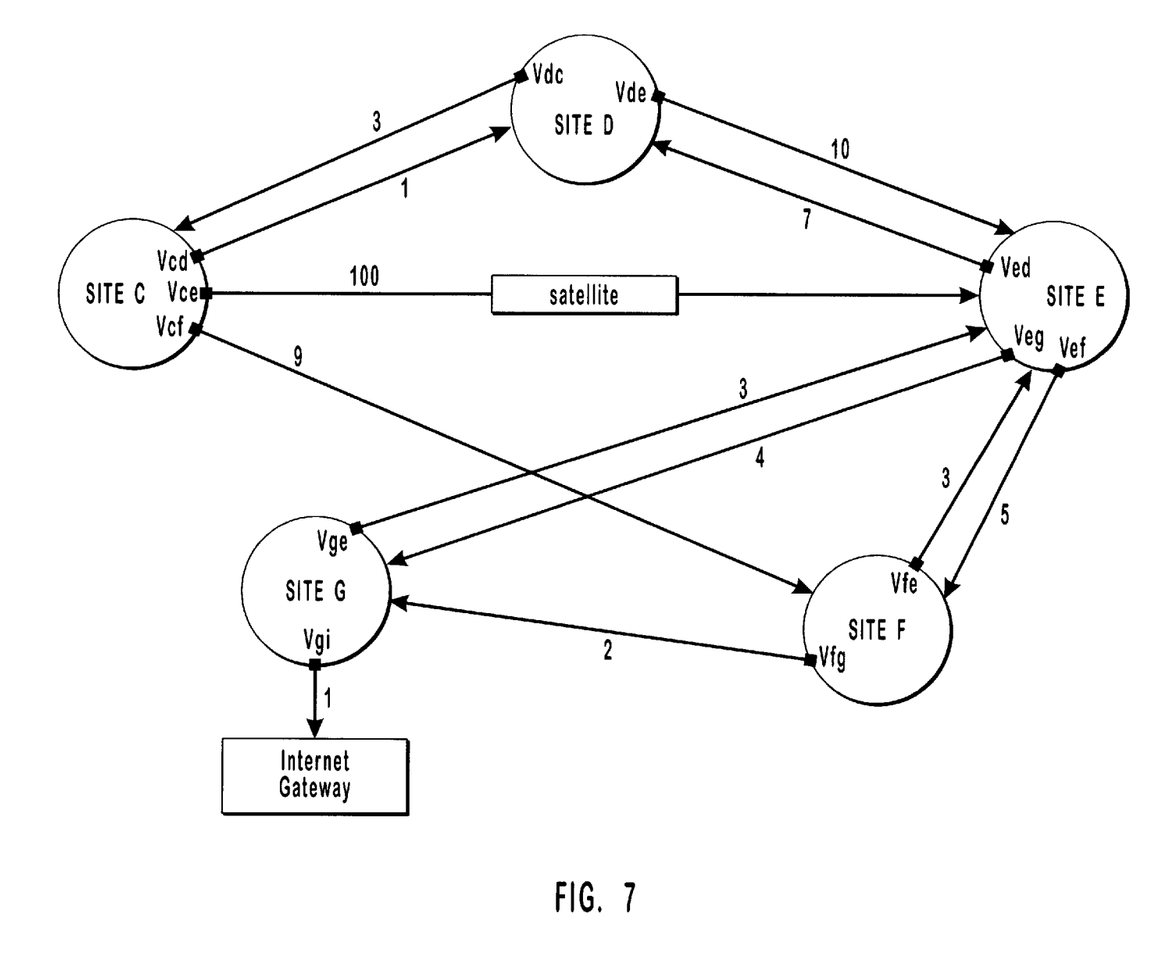
FIG. 7 is a simplified block diagram of a complex messaging system.
Figure 8:
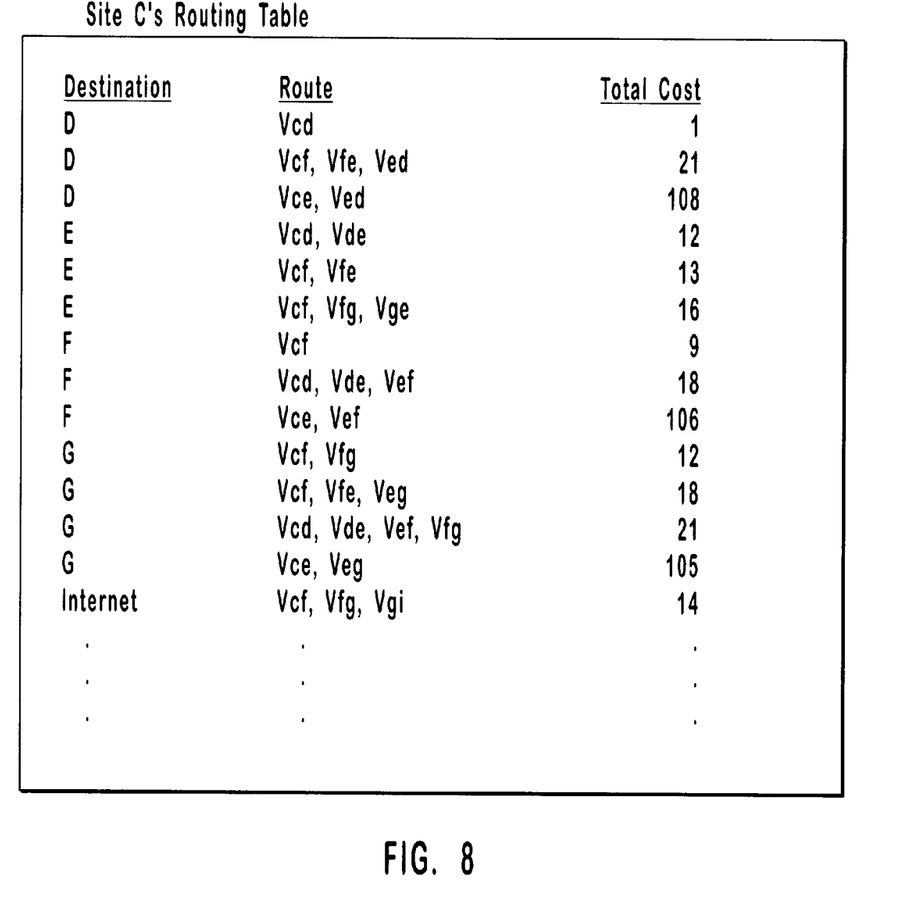
FIG. 8 is a simplified message routing table for site C in FIG. 7.

An example of using the routing information contained in a routing table to deliver a message from one address space to another is provided with reference to FIGS. 7 and 8. The system shown in FIG. 7 is a simplified block diagram of a messaging system having a fairly complex topology. In particular, sites C, D, E, F and G are shown with arrows indicating potential communication paths or hops between the different sites. The numbers above the arrows between sites depict a cost value for each hop from the perspective of site C. Some of the hops between adjacent sites have different cost values, for example, the hop between site D and site E is valued at 10 units in one direction, but as only costing 7 units in the reverse direction. Such cost value differences may occur because the site C routing information routine inherits knowledge of these hops from remote sites and then calculates a local cost value.

The messaging organization shown in FIG. 7 contains five separate address spaces (or "nodes"), C-G, at this time. The nodes may be of the same type (i.e., operating under messaging software from same vendor and/or using same address scheme) or one or more nodes may be foreign with respect to the other nodes. A foreign node may serve as an intermediate path to connect two other nodes of the same type. In any event, messages are routed across the various nodes in a manner transparent to the end-users even though several different types of nodes and messaging software may be in place.

After the nodes in the organization have been initialized, the distributed directory service makes a first pass to permit replication of routing data, and each node is then capable of sending a message to at least one other node. The distributed directory service then continues to operate, and will typically settle out after N-1 iterations, where N is the number of nodes.

FIG. 8 is a simplified rendition of the message routing table for site C in the messaging system of FIG. 7. O/R address information is not shown in order to focus the discussion on the total cost parameter generated by site C's local RID process. In addition, not all of the possible route permutations are depicted.

Referring to FIGS. 7 and 8, a message generated by a user in site C for a user in site D may travel directly from site C to site D using connector Vcd at a total cost of 1 unit. However, if this primary route is unavailable, a secondary route using connection Vcf can be used at a total cost of 21 (9+3+7+2 extra units for 2 intermediate hops). This secondary route will direct the message to take three hops from site C through nodes F and E to arrive at site D, and will continue to be used until the primary route becomes available. The primary route will be tried again after a message timer resets. The message timer is preset by each administrator to run for a specified amount of time when a primary route is unavailable, and the duration is based on local considerations. A third possible route to send a message from site C to site D is by using connector Vce to connect to site E via a satellite link, and as shown this route is the most expensive at a total cost of 108 units.

Again referring to FIG. 8, other message routes from site C to sites E, F and G, as well as to an internet gateway, are shown along with their respective total cost values. Of the three possible routes shown for getting to site E from site C, two use the same connector Vcf but have different total cost values, 13 units (C-F-E) and 16 units (C-F-G-E) respectively, which reflect taking different routes having different intermediate hops. The difference in total cost stems from the fact that the message travels from node C to F to E on one route, and from nodes C to F to G to E on the other route and from the fact that a different number of intermediate hops are encountered.

In the above example of FIGS. 7 and 8, the routes identified in the routing table represent that particular site's most recent snapshot of the network topology. In fact, because the regeneration of a routing table necessarily lags behind changes in network topology, an MTA in a particular site can never be certain that the path it designates for the delivery of a particular message will be followed. What is certain, however, is that each successive MTA along the route will choose the next potential hop that has the lowest associated cost. An MTA has no control over the route that is actually followed once the message leaves its site. It is up to the next MTA along the route to pick the best (i.e., lowest cost) available route to deliver the message, taking into account its knowledge of the network topology.

For example, if one of the communication paths along the route becomes permanently or temporarily unavailable, the message will deviate from the original path envisioned by the originating MTA and take the route designated by a remote MTA at the site having the failed connection. Similarly, if due to replication latency an intermediate site along the path has acquired access to a route having a lower cost than the one known by the originating site, the MTA for the intermediate site will choose that new lower cost route. This ensures that the lowest cost route will always be taken even if the various sites have inconsistent views of the network topology.

The techniques described above are useful in client/server electronic mail network applications, wherein many users working with personal computers at a local site may send messages to each other and to users at remote or foreign sites. Each site maintains its own message routing table of address spaces containing information from the perspective of that local site. The information in a message routing table includes address spaces, connector or gateway identification, and cost information that is utilized to determine the best route for a message to take to reach a final destination.

Other embodiments are within the scope of the following claims.

We claim:

1. In an electronic messaging system that includes a plurality of sites each identified by a unique address space and having connectivity to at least one other site in the plurality of sites, and each site having one or more servers to which one or more client systems are connected, a method of automatically discovering changes in routing information generated at any one or more of the servers at any one or more of the plurality of sites, and thereafter automatically replicating the updated routing information that is available for use by every other server at every other site in the system, the method comprising the steps of:

generating at one or more servers of a first site a repository of information which defines a set of remote sites, potential routes for reaching said remote sites, and at least one component that serves as a connector for facilitating intersite communication by configuring and managing connections across different sites;

periodically replicating at said one or more servers of said first site the repository of information at said one or more servers in order to facilitate updated repository information that has been changed, added to or deleted from said repository; and periodically automatically replicating said updated repository information to every other server at every other site by:

broadcasting said updated repository information from at least one server at said first site to at least one server at a second site that has a direct communication path with said at least one server at said first site from which said updated repository information was broadcast; and automatically broadcasting said updated repository information from at least one server at said second site to at least one server at a third site that has a direct communication path with said at least one server at said second site from which said updated repository information was broadcast, and so on, until said updated repository information is replicated throughout all sites.

2. The method of claim 1 in which the step of periodically automatically replicating said updated repository information to every other server at every other site results in an accumulation, at every other site, of updated routing information specifying routes by which messages may be routed between servers in different sites.

3. The method of claim 1 in which the step of periodically automatically replicating said updated repository information to every other server at every other site further comprises the step of assimilating the updated repository information into repository information previously stored at the second site to generate an updated accumulation of routing information at the second site.

4. The method of claim 3 in which the step of assimilating ignores a subset of said updated repository information in generating said updated accumulation of routing information.

5. The method of claim 4 in which the ignored subset of said updated repository information comprises previously known and unchanged message routing information.

6. The method of claim 4 in which the ignored subset of said updated repository information comprises message routing information that would cause a message to loop back to its origin.

7. The method of claim 3 in which the step of assimilating comprises regenerating a routing table at the second site to include message routing information included in said updated repository information, the routing table comprising at least one destination site, one or more routes to reach the at least one destination site from the second site, and a total cost for using each of the one or more routes.

8. The method of claim 7 in which said one or more routes each comprises a plurality of connectors specified in a sequential order, each of said plurality of connectors providing direct connectivity between two sites, such that a message being sent via one of said one or more routes is passed sequentially from one connector to the next connector in the route until the message reaches the destination site associated with the route.

9. The method of claim 8 in which each connector in a route has an individual cost which collectively represent the total cost to send a message by that route.

10. The method of claim 9 in which the total cost for a route is automatically increased by a predetermined amount for each intermediate site in that route between the first site and the destination site.

11. The method of claim 9 in which the individual cost associated with a particular connector represents a predetermined measure of resources for using that connector.

12. The method of claim 11 in which the predetermined measure of resources comprises at least one of (i) monetary expense incurred by using the connector; (ii) amount of bandwidth used to send a message by that connector; or (iii) measure of processing power used to send a message by that connector.

13. The method of claim 1 in which the updated repository information comprises a plurality of alternative message routes for reaching one or more destination sites and a plurality of associated total costs for using the respective routes, and wherein the method further comprises the step of choosing one of the plurality of alternative routes by which to send a message on the basis of its associated cost.

14. The method of claim 13 in which the step of choosing comprises the step of selecting a message route having a lowest associated total cost.

15. The method of claim 13 in which, when the message route having the lowest associated total cost is unavailable, the step of choosing comprises the step of selecting a message route having an associated total cost that is greater than the lowest total cost.

16. In an electronic messaging system that includes a plurality of sites each identified by a unique address space and having connectivity to at least one other site in the plurality of sites, and each site having one or more servers to which one or more client systems are connected, a method of automatically discovering changes in routing information generated at any one or more of the servers at any one or more of the plurality of sites, and thereafter automatically replicating the updated routing information that is available for use by every other server at every other site in the system, the method comprising the steps of:

maintaining a first routing table at a first site of the electronic messaging system and a second routing table at a second site of the electronic messaging system, each routing table identifying at least one destination site and a plurality of routes for reaching the at least one destination site;

changing the configuration of the first site, such that the first and second routine tables are out of date with the changed configuration;

updating the first routing table so as to be current with the changed configuration; and automatically replicating message routing information contained in the first routing table to other sites, such that each routing table is current with the changed configuration, including the steps of:

automatically broadcasting the message routing information from said first site to said second site; and assimilating at the second site, the message routing information into the second routing table to generate an updated second routing table.

17. The method of claim 16 in which each of the plurality of routes comprises a one or more connectors specified in a sequential order, each connector providing direct connectivity between two sites, such that a message being sent via one of said plurality of routes is passed sequentially from one connector to the next connector in the route until the message reaches the at least one destination site.

18. The method of claim 17 in which each connector in a route has an individual cost which collectively represent the total cost to send a message by that route.

19. The method of claim 18 in which the total cost for a route is automatically increased by a predetermined amount for each intermediate site in that route between an originating site and the destination site.

20. The method of claim 18 in which the individual costs of connectors are preassigned by a human operator.

21. The method of claim 16 in which each routing table further identifies a total cost associated with each of the respective plurality of routes.

22. The method of claim 21 further comprising the steps of:

choosing one of the plurality of routes based on its associated total cost; and sending a message from an originating site to the destination site using the chosen route.

23. The method of claim 22 in which said one of the plurality of routes traverses at least one intermediate site between the originating site and the destination site, the method further comprising the step of departing, at the intermediate site, from the route designated at the originating site by choosing a different route over which the message will travel to the destination site.

24. The method of claim 23 in which the step of departing is performed when a connector in the route designated at the originating site is unavailable.

25. The method of claim 23 in which the step of departing is performed when a connector having a lower cost than a connector in the route designated at the originating site is available at the intermediate site.

26. The method of claim 22 in which the step of choosing comprises the step of selecting a message route having a lowest associated total cost.

27. The method of claim 26 in which, when the message route having the lowest associated total cost is unavailable, the step of choosing further comprises the step of selecting a message route having an associated total cost that is greater than the lowest total cost.

28. The method of claim 22 further comprising the step of re-routing the message after it leaves an originating site but before it reaches the destination site.

29. The method of claim 28 in which the step of re-routing permits the electronic messaging system to dynamically adapt to changes in network topology to send the message over a route having a lowest total cost between the originating site and the destination site.

30. The method of claim 16 in which the step of automatically replicating message routing information further comprises the steps of:

automatically broadcasting the message routing information from said second site to a third site of said electronic messaging system; and assimilating the message routing information into a third routing table at the third site to generate an updated third routing table.

31. A computer program product for implementing a method of automatically updating message routing information at a first site in an electronic messaging system when a change in the configuration of a remote site in the electronic messaging system is made, the electronic messaging system including a plurality of sites, each site having a unique address space and having connectivity to at least one other site in the plurality of sites, the computer program product comprising:

a computer-readable medium having computer-executable instructions for performing the steps of:

receiving, at the first site, message routing information broadcast by a second site in the electronic messaging system after a change in the configuration of the second site or another site has been made the message routing information defining routes by which messages can be sent between sites in the electronic messaging system:

generating an updated accumulation of message routing information at the first site by assimilating the received message routing information into an accumulation of previously known message routing information; and replicating the updated accumulation of message routing information to other sites in the electronic messaging system.

32. The computer program product of claim 31 in which the message routing information comprises a total cost for each of the routes from the second site to one or more of the plurality of sites, the total costs representing a predetermined measure of resources that is expended when the respective routes are used to send a message.

33. The computer program product of claim 32 in which the computer-readable medium further has computer-executable instructions for performing the step of using the total costs to route messages to one or more of the plurality of sites by choosing the route have the lowest associated total cost.

34. A computer program product for implementing a method of automatically updating message routing information in a plurality of sites in an electronic messaging system when the configuration of a first site in the electronic messaging system is changed, each of the plurality of sites having a unique address space and having connectivity to at least one other site in the plurality of sites, the computer program product comprising:

a computer-readable medium having computer-executable instructions for performing the steps of:

maintaining a first routing table at the first site, a second routing table also being maintained at a second site in the electronic messaging system, each routing table identifying at least one destination site, a plurality of routes for reaching the at least one destination site, and a total cost associated with each of the respective plurality of routes;

in response to the configuration of the first site being changed, automatically updating the first routing table so as to be current with the changed configuration; and automatically replicating message routing information contained in the updated first routing table to the second site such that each routing table can be made current with the changed configuration, including the step of:

broadcasting the message routing information to the second site, thereby making the message routing information available to be assimilated into a second routing table at the second site to generate an updated second routing table.

35. The computer program product of claim 34 in which each of the plurality of routes comprises one or more connectors specified in a sequential order, each connector providing direct connectivity between two sites, such that a message being sent via one of said plurality of routes is passed sequentially from one connector to the next connector in the route until the message reaches the at least one destination site.

36. The computer program product of claim 35 in which each connector in a route has an individual cost which collectively represent the total cost to send a message by that route.

37. The computer program product of claim 36 in which the total cost for a route is automatically increased by a predetermined amount for each intermediate site in that route between an originating site and the destination site.

38. The computer program product of claim 36 in which the individual cost associated with a particular connector represents a predetermined measure of resources for using that connector.

39. The computer program product of claim 34 in which the computer-readable medium further has computer-executable instructions for performing the steps of:

choosing one of the plurality of routes based on its associated total cost; and sending a message from an originating site using the chosen route.

40. The computer program product of claim 39 in which said chosen route traverses at least one intermediate site between the originating site and the destination site, the computer-readable medium further having computer-executable instructions for performing the step of causing a message to depart from the chosen route by selecting a different route over which the message will travel to the destination site.

41. The computer program product of claim 39 in which the computer-readable medium further has computer-executable instructions for performing the step of causing a message to depart from the chosen route when a connector in the chosen route is unavailable.

42. The computer program product of claim 39 in which the computer-readable medium further has computer-executable instructions for performing the step of causing a message to depart from the chosen route when a connector having a lower cost than a connector in the chosen route is available at an intermediate site.

43. The computer program product of claim 41 in which the step of choosing comprises the step of selecting a message route having a lowest associated total cost.

44. The computer program product of claim 43 in which the step of choosing further comprises the step of selecting a message route having an associated total cost that is greater than the lowest total cost when the message route having the lowest associated total cost is unavailable.

45. The computer program product of claim 41 in which the computer-readable medium further has computer-executable instructions for performing the step of causing the message to be re-routed after it has left the originating site by dynamically adapting to changes in network topology to send the message over a route having a lowest total cost between the originating site and the destination site.

* * * * *

UNITED STATES PATENT AND TRADEMARK OFFICE
CERTIFICATE OF CORRECTION

PATENT NO. : 5,920,697
DATED : July 6, 1999
INVENTOR(S) : Steven Paul Masters, Eric Neil Lockard It is certified that error appears in the above-identified patent and that said Letters Patent are hereby corrected as shown below:

Col. 1, ln. 44: after "factors such" and before "the bandwidth" insert --as--

Col. 7, ln. 30: after "thereby" change "signalling" to --signaling--

Col. 10, ln. 30: after "connector" delete [is]

Col. 13, ln. 9: after "thus may" delete [be]

Col. 17, ln. 5: after "second" change "routine" to --routing--

Col. 18, ln. 29: after "been made" insert --,--

Col. 18, ln. 32: after "system" change ":" to --;--

Col. 20, ln. 23: after "claim" change "41" to --39--

Col. 20, ln. 31: after "claim" change "41" to --39--

Signed and Sealed this

Twenty-fifth Day of July, 2000

Attest:

Attesting Officer

Q. TODD DICKINSON
Director of Patents and Trademarks